W. C. RASTETTER.
STEERING WHEEL.
APPLICATION FILED SEPT. 28, 1921.
1,437,196.
Patented Nov. 28, 1922.
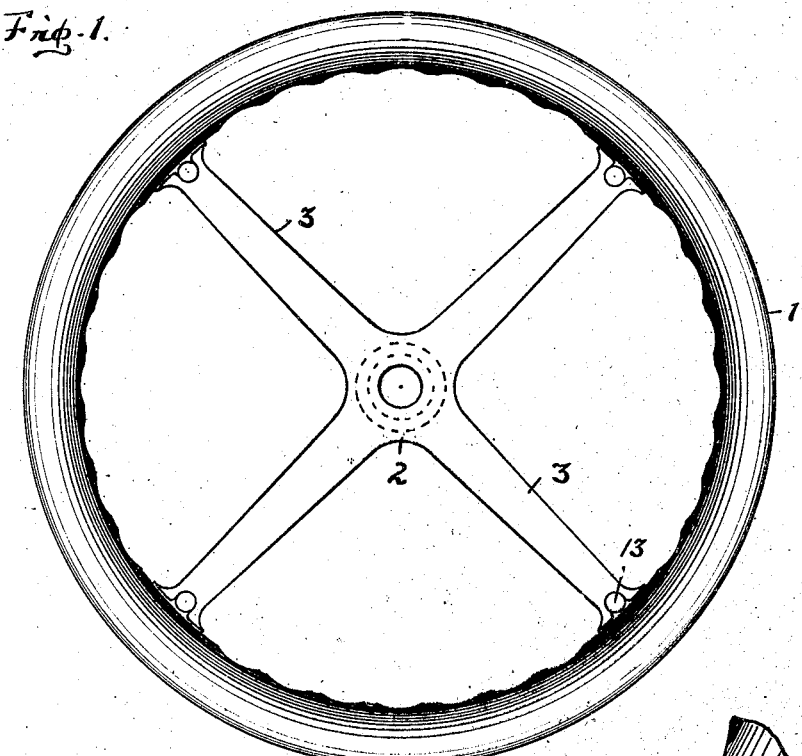
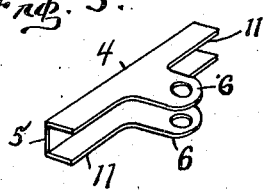
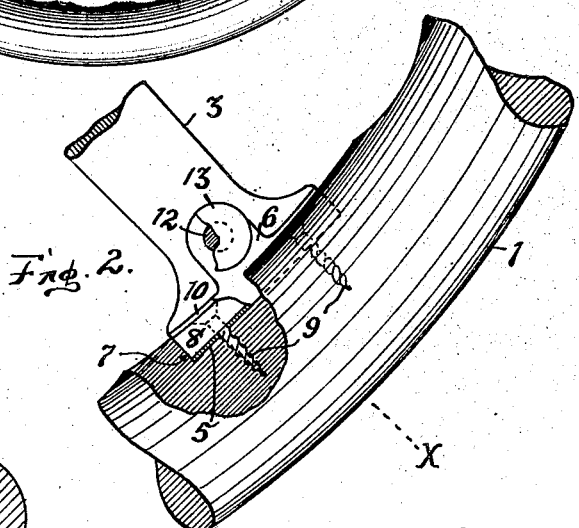
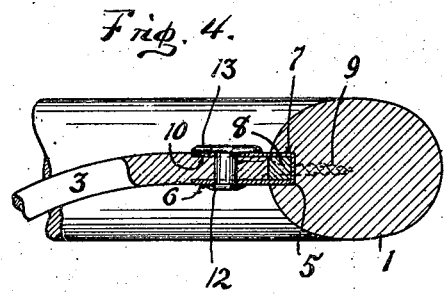
Inventor
William C. Rastetter
By W. G. Burns, Attorney Patented Nov. 28, 1922.

1,437,196

UNITED STATES PATENT OFFICE.

WILLIAM C. RASTETTER, OF FORT WAYNE, INDIANA.

STEERING WHEEL.

Application filed September 28, 1921. Serial No. 503,750.

*To all whom it may concern:*

Be it known that I, WILLIAM C. RASTETTER, a citizen of the United States of America, and resident of Fort Wayne, in the county of Allen and State of Indiana, have invented certain new and useful Improvements in Steering Wheels, of which the following is a specification.

This invention relates to improvements in steering wheels for automobiles, especially of that class having a wooden rim mounted upon a metallic spider, and the object of the invention is the provision of fastening means for connecting the ends of the spider arms with the wooden rim so constructed as to be substantial and permanent. It has been the practice in securing the ends of the spider arms to the wooden rim, to cut away considerable portions of the wooden rim for the admission of the ends of the spider arms and to admit of applying screws for holding the arms rigidly in connection with the rim, and subsequently plugging up the cut away portions with wood to conceal the securing screws and inserted ends of the spider. This method weakens the rim and requires careful refinishing operations. The present invention contemplates forming connections between the spider arms and the rim without unnecessary mutilation of the rim and so the securing means will be concealed from view without resorting to plugging and refinishing operations.

These objects of the invention are accomplished by the construction illustrated in the accompanying drawings, in which:—

Fig. 1 is a plan view of a steering wheel embodying the invention;

Fig. 2 is a detail plan view showing a portion of a wooden rim and one of the spider arms in connection therewith, parts being shown broken away;

Fig. 3 is a perspective view showing one of the securing clips used in the construction; and Fig. 4 is a detail view showing a section of Fig. 2 on the line $x$ thereof.

The characters appearing in the description refer to parts shown on the drawings and designated thereon by corresponding characters:

The invention comprises a wooden rim 1 mounted in connection with a spider 2 having radial arms 3 which are connected respectively at their outer ends with the rim 1. In forming the connection of each arm with the rim, a clip 4 is employed, the clip having an elongated channel base 5 from which extend a pair of perforated ears 6. In the rim is made a recess 7 for each clip shaped to receive the base thereof, and the clip is secured in place by a corresponding cleat 8 that is positioned in the channel base and secured by means of screws 9 that extend through the cleat and base into the rim. The outer end of each arm 3 has a recess 10 in its top and bottom shaped to receive the corresponding outer edges 11 of the channel base and ears 6, and each arm is secured between the corresponding ears by a rivet 12, the head 13 of which is of such size that a portion of its circumference will conform with the contour of the outer end of the uppermost ear and thus conceal it in the recess in which it extends.

By this construction the clips are held in a very substantial manner in connection with the rim, and the arms are held fixedly in connection with the clips. Also, as the ends of the arms project between the outer edges 11 of the channel base and against the cleats therein so as to cover the screws, the screws are thereby concealed from view as well as being prevented from becoming loose.

What I claim is:—

1. In a steering wheel having a metallic spider and wooden rim, a series of clips, one for each of the arms of the spider; a cleat for each clip including means extending through the cleat and clip into the rim permanently holding the same in place; and means for permanently securing the clip and the end of the corresponding arm together.

2. In a steering wheel, including a spider and rim, a securing means for connecting the ends of the spider arms respectively to the rim, comprising a clip having a channel base and extending ears, positioned with its base extending into a corresponding recess made in the inner perimeter of the rim, and with the ears projecting therefrom; means in connection with each clip and rim for permanently securing the same together; and means for permanently securing the end of each spider arm in connection with the ears of the corresponding clip, said end of each arm being so formed as to conceal the securing means for holding the corresponding clip in connection with the rim.

3. In a steering wheel having a spider and rim, a series of clips partially embedded in the inner perimeter of the rim; a cleat having securing means in connection therewith extending through the corresponding clip into the rim permanently holding the clip in place, each clip having extending portions fitted in connection with the end of the corresponding arm of the spider; and a securing means for the respective clips and arms of the spider adapted to partially conceal the extending portion of the same.

In testimony whereof I affix my signature, in presence of two witnesses.

WILLIAM C. RASTETTER.

Witnesses:
MATILDA METTLER,
LUCY E. JONES.